(12) United States Patent
Neidorff et al.

(10) Patent No.: US 11,476,760 B2
(45) Date of Patent: Oct. 18, 2022

(54) SEMICONDUCTOR PROCESS VARIATION DETECTOR

(71) Applicant: TEXAS INSTRUMENTS INCORPORATED, Dallas, TX (US)

(72) Inventors: Robert Allan Neidorff, Bedford, NH (US); Saurav Bandyopadhyay, Dallas, TX (US); Ramanathan Ramani, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 154 days.

(21) Appl. No.: 16/927,558

(22) Filed: Jul. 13, 2020

(65) Prior Publication Data

US 2021/0013805 A1 Jan. 14, 2021

Related U.S. Application Data

(60) Provisional application No. 62/872,968, filed on Jul. 11, 2019.

(51) Int. Cl.
*H02M 3/158* (2006.01)
*H02M 1/08* (2006.01)
*H02M 3/157* (2006.01)

(52) U.S. Cl.
CPC .............. *H02M 3/158* (2013.01); *H02M 1/08* (2013.01); *H02M 3/157* (2013.01)

(58) Field of Classification Search
None
See application file for complete search history.

(56) References Cited

U.S. PATENT DOCUMENTS

| 6,691,239 | B1* | 2/2004 | Rose ......................... G06F 1/26 |
| | | | 713/330 |
| 7,061,217 | B2* | 6/2006 | Bayer .............. H03K 17/08122 |
| | | | 323/317 |
| 10,181,854 | B1* | 1/2019 | Kobayashi ..... H03K 19/018521 |
| 2017/0063369 | A1* | 3/2017 | Boakye ................... H02M 1/08 |
| 2018/0123578 | A1* | 5/2018 | Chauhan .............. H03K 17/687 |

(Continued)

OTHER PUBLICATIONS

Vermeire et al., "Die-Level Process Monitor For Mixed Signal Designs," © 2020 Design And Reuse, 5 p.

(Continued)

*Primary Examiner* — Matthew V Nguyen
(74) *Attorney, Agent, or Firm* — Michael A. Davis, Jr.; Charles A. Brill; Frank D. Cimino

(57) ABSTRACT

In some examples, a system includes a voltage source terminal, a voltage reference terminal, a field effect transistor (FET), a current source, a comparator, and adjustment circuitry. The FET has a gate terminal and a non-gate terminal, the gate terminal coupled to the voltage source terminal. The current source is coupled to the non-gate terminal. The comparator has a comparator output and first and second comparator inputs, the first comparator input coupled to the non-gate terminal, and the second comparator input coupled to the voltage reference terminal. The adjustment circuitry has a circuitry input and a circuitry output, the circuitry input coupled to the comparator output, and the adjustment circuitry configured to adjust the circuitry output responsive to the circuitry input, in which the adjustment reduces a drive strength of the circuit.

24 Claims, 3 Drawing Sheets

(56) References Cited

U.S. PATENT DOCUMENTS

2020/0266802 A1* 8/2020 Shreepathi Bhat ...... H03K 5/24
2022/0158554 A1* 5/2022 Gibson ............... H02M 1/0025

OTHER PUBLICATIONS

Wang et al., "Parameter-Specific Ring Oscillator For Process Monitoring At The 45 nm Node," Dept. of Electrical Engineering and Computer Sciences, University of California, Berkeley, © 2010 IEEE, 4 p.

Payne, D., "Why It's A Good Idea to Embed PVT Monitoring IP in SoCs," Feb. 16, 2018, 7 p.

* cited by examiner

SEMICONDUCTOR PROCESS VARIATION DETECTOR

CROSS-REFERENCE TO RELATED APPLICATION

This application claims priority to U.S. Provisional Patent Application No. 62/872,968 filed Jul. 11, 2019, which is hereby incorporated herein by reference in its entirety.

BACKGROUND

During manufacturing processes for electronic components, variations in the attributes of the components may occur. These variations are known as process variations. Process variations of various attributes of a component may work together to create variations in one or more parameters of that component, such as the drive current of a transistor.

SUMMARY

In at least one example, a system includes a voltage source terminal, a voltage reference terminal, a field effect transistor (FET), a current source, a comparator, and adjustment circuitry. The FET has a gate terminal and a non-gate terminal, the gate terminal coupled to the voltage source terminal. The current source is coupled to the non-gate terminal. The comparator has a comparator output and first and second comparator inputs, the first comparator input coupled to the non-gate terminal, and the second comparator input coupled to the voltage reference terminal. The adjustment circuitry has a circuitry input and a circuitry output, the circuitry input coupled to the comparator output, and the adjustment circuitry configured to adjust the circuitry output responsive to the circuitry input, in which the adjustment reduces a drive strength of the circuit.

In at least one example, a system includes a voltage source terminal, a current source, a FET, a comparator, and a circuit. The FET has a gate terminal and a non-gate terminal, the gate terminal coupled to the voltage source terminal, and the non-gate terminal coupled to the current source. The comparator has a comparator input and a comparator output, the comparator input coupled to the non-gate terminal, and the comparator output configured to indicate a drive strength of the FET. The circuit has a circuit input and a circuit output, the circuit input coupled to the comparator output, the circuit output adapted to be coupled to a power FET, and the circuit configured to reduce a drive strength of the circuit output responsive to the circuit input.

In at least one example, a system includes a voltage source terminal, a current source, a first FET, a driver circuit, a second FET, and a comparator. The first FET is a power FET. The driver circuit has a driver circuit input and a driver circuit output, the driver circuit output coupled to the first FET, and the driver circuit configured to adjust a signal at the driver circuit output responsive to the driver circuit input. The second FET has a gate terminal and a non-gate terminal, the gate terminal coupled to the voltage source terminal, and the non-gate terminal coupled to the current source. The comparator has a comparator input and a comparator output, the comparator input coupled to the non-gate terminal, and the comparator output coupled to the driver circuit input and configured to indicate a drive strength of the second FET.

In at least one example, a method includes applying a reference voltage between a gate terminal and a first non-gate terminal of a FET. The method also includes applying a reference current to a second non-gate terminal of the FET. The method further includes measuring a voltage at the second non-gate terminal. The method also includes, responsive to a comparison of the voltage at the second non-gate terminal to a threshold, taking a corrective action to reduce a drive strength of a circuit that includes the FET.

DETAILED DESCRIPTION

Figure 1:
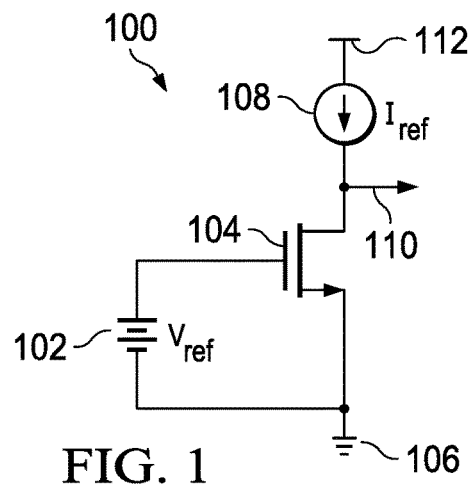
FIG. 1 is a schematic diagram of an example system in accordance with various examples.

Process variations that occur during the manufacture of electronic components can exhibit a variety of forms. For example, in a FET, the length of the device, width of the device, gate oxide thickness, and channel doping may exhibit process variations. As described above, these process variations and others may work together to create variations in one or more parameters of the FET, such as the threshold voltage or the drive current of the FET.

In some cases, some amount of process variation is acceptable if the variation is within a certain range. For example, oscillator frequency variation is often acceptable if it is within a specific range. However, process variations beyond an acceptable level of variance can cause excessive currents, voltages, or ringing in some applications. Excessive variations can thus damage a circuit, reduce its effectiveness, or render it inoperable.

In some integrated circuits, one problematic type of process variation is the drive strength of a transistor. In the FET example, the FET's drive strength is a function of its drain to source current ($I_{DS}$) capability. This current "drives" the output to charge and discharge the capacitance at the transistor's output to a programmed value. When a transistor has higher drive strength, more current can be drawn from the supply, and the output capacitance can be charged and discharged quickly. When a transistor has lower drive strength, less current can be drawn, and the output capacitance takes more time to charge and discharge. A larger load at the output will use greater drive strength to charge and discharge at a given speed, compared to charging and discharging a smaller load at the same speed.

In a buck converter, which is a power converter that steps down voltage from its input to its output, drivers are useful to drive power FETs at an output. The drivers charge and discharge the gate capacitances of the power FETs when the power FETs are turned on and off. The rate at which the gate capacitances are charged and discharged by a driver is thus dependent on the drive strength of the FETs within the driver, as described above. Because of process variations during the manufacture of the transistors within the drivers, some drivers may be too strong (e.g., if the transistor drive strengths are too high) for the device to operate properly. For example, drivers that are too strong may charge and discharge power FET gate capacitances at the output of the drivers too quickly. Charging and discharging power FET gate capacitances too quickly can cause rapid change in current in stray inductances and/or capacitances, thereby leading to overshoot and/or ringing (unwanted oscillation of a voltage or current). Ringing can damage a circuit or cause it to operate incorrectly. Therefore, process variations that result in excessive drive strength can cause problems in a circuit or device.

As described herein, an electronic device is adaptively adjusted responsive to the device's transistors exhibiting a drive strength that is above an acceptable range or threshold due to process variations. If the transistors are too strong, the drive strength of the drivers can be reduced and/or the drive current ($I_{DS}$) can be lowered by adjusting appropriate adjustment circuitry. Adjustment circuitry can comprise a circuit input and a circuit output. In examples herein, the transistor that is tested for process variations comprises a FET, but other types of transistors may be tested in other examples.

More specifically, and as described below, an example detector detects a characteristic (such as a voltage or current) of a transistor that varies with process variations, and the detector compares that characteristic to one or more thresholds. The detector can output a logic value (such as high or low) that indicates transistor drive strength, and that logic value is useful to take corrective action. In some examples, a FET to be tested is biased with a reference voltage between the gate and the source of the FET, and a current source provides a specific amount of current into the drain terminal of the FET. If the FET is strong due to process variations (such as being capable of conducting a high $I_{DS}$), then the FET will conduct most or all current from the current source, and the voltage value at the drain terminal of the FET will be low. Conversely, if the FET is weak (or if the FET has an acceptable strength), then the FET will conduct less current from the current source FET, and the voltage value at the drain terminal of the FET will be high. The voltage value (high or low) at the drain terminal indicates whether the FET is weak or strong. If the FET (and, thus, the driver in which the FET is located) is too strong for a given circuit or device, an appropriate corrective action may be taken to prevent ringing or other damaging effects. Appropriate corrective actions may include trimming the device during testing, switching (in or out) FETs in a driver to change driver strength, or switching (in or out) a resistance to change driver strength. A p-channel FET (PFET) can be tested in some examples, and corrective actions may be taken for PFETs. In other examples, an n-channel FET (NFET) can be tested, and corrective actions may be taken for NFETs. In another example, a PFET and an NFET may each be tested, and appropriate corrective actions can be taken for one or both types of FETs.

In some examples, monitoring or testing one FET of an electronic device provides a representative indication of the strength of most or all other FETs across the entire electronic device, die or wafer. This is because some process variations are correlated across many or all FETs on the device, die or wafer. Thus, one FET can be tested for process variations, and the other FETs on the device can be assumed to exhibit similar process variations. Accordingly, in some examples, corrective actions can be taken on one or more other FETs on the electronic device, die or wafer based on the process variations detected in the single tested FET.

FIG. 1 is a schematic diagram of an example system 100. System 100 is useful to test a representative FET to determine whether process variations have rendered the FET too strong relative to a threshold. As described above, the results of the test may also indicate that other FETs co-manufactured with the representative FET are also too strong relative to the threshold. Accordingly, a variety of corrective actions may be taken if one or more of the FETs are too strong. In at least some examples, the system 100 is an electronic device that includes a voltage source $V_{ref}$ 102 (e.g., a voltage reference terminal), a FET 104 to be tested for process variations, and a current source $I_{ref}$ 108. FET 104 is an NFET in this example. A PFET can be tested in another example. In another example, both an NFET and a PFET can be tested, and corrective actions can be taken for either type or both types, depending on the outcome of the tests. As shown in FIG. 1, $V_{ref}$ 102 is coupled to ground 106 and the gate terminal of FET 104. $V_{ref}$ 102 provides a voltage between the gate terminal of FET 104 and the source terminal of FET 104, which is further coupled to ground 106. $I_{ref}$ 108 is coupled to a voltage source terminal 112 and coupled to the drain terminal of FET 104 and provides a reference current to the drain terminal of FET 104. In examples described herein, drain and source terminals may also be referred to as non-gate terminals. In an example, $V_{ref}$ 102 provides approximately 1 Volt, and $I_{ref}$ 108 provides approximately 10 μA. Other examples may use any suitable values for voltages provided by $V_{ref}$ 102 and currents provided by $I_{ref}$ 108. Also, in other examples, $I_{ref}$ 108 may be replaced by a resistor connected to a voltage source or other circuit supplying current.

In one example, the circuitry of system 100 can be manufactured on a device, and a test engineer can test a single representative FET on a chip or in a device using system 100. If the result of the test indicates that the FET is too strong relative to a threshold, then the test engineer can then take one or more appropriate corrective actions, as described below. Because some process variations in one FET are often similar to process variations in other FETs, the test engineer may take corrective actions on some, many or all FETs on the device. In another example, the test engineer tests multiple FETs and then takes corrective actions on subsets of FETs based on the results of the tests. In either of the above two examples, after the corrective actions are taken by the test engineer, the device can be shipped to a customer, and no further corrective actions are taken. Thus, the device is more likely to operate appropriately, because the corrective actions taken by the test engineer counter the effects of the process variations. In another example, a circuit such as system 100 is manufactured on the device and remains to actively monitor one or more FETs while the device is in operation by a customer. In this example, a characteristic of the FET (such as a voltage or current associated with the FET) that varies with process variation is monitored while the FET is in operation. If the characteristic exceeds a threshold during operation, additional adjustment circuitry turns on, turns off, or otherwise implements a specific corrective action. Multiple FETs may be actively monitored in some examples, and multiple corrective actions may be taken in some examples. The specific corrective actions operate to counter, at least in part, the process variations. This type of active monitoring is described below.

Referring again to FIG. 1, in an example operation, FET 104 is stronger than normal due to process variations. For example, FET 104 may have a width or gate oxide thickness that is different than normal due to process variations. These process variations can increase the drain to source current capability of FET 104, which means FET 104 has "high strength" and is a "strong" device. If FET 104 is stronger than normal, during the operation of system 100, FET 104 will conduct most or all current from $I_{ref}$ 108. Node 110 coupled to the drain terminal of FET 104 will therefore exhibit a low voltage (such as a logical low if the voltage at the node 110 is quantized). Conversely, if FET 104 has a normal strength due to process variations that are below or at an acceptable level, FET 104 will conduct less current from $I_{ref}$ 108, and node 110 will exhibit a high voltage (such as a logical high if the voltage at the node 110 is quantized). The level of the voltage measured at node 110 indicates whether FET 104 has a normal strength within a particular threshold or has a high strength above the particular threshold due to process variations. If FET 104 has an acceptable strength, then no corrective action is taken. If FET 104 has high strength, then a corrective action can be taken to counter the high strength and reduce ringing or other harmful effects.

FIG. 1 shows a solution for testing any individual FET for certain types of process variations. If a test engineer utilizes this approach and finds process variations for a FET that are too high, then the test engineer may trim this FET and/or one or more other FETs to counter the effects of the process variations. Trimming may include altering a physical parameter of a FET, such as a length or width. In other examples, additional adjustment circuitry may be implemented that alters driver strength during operation when process variations are high, as described below.

Figure 2:
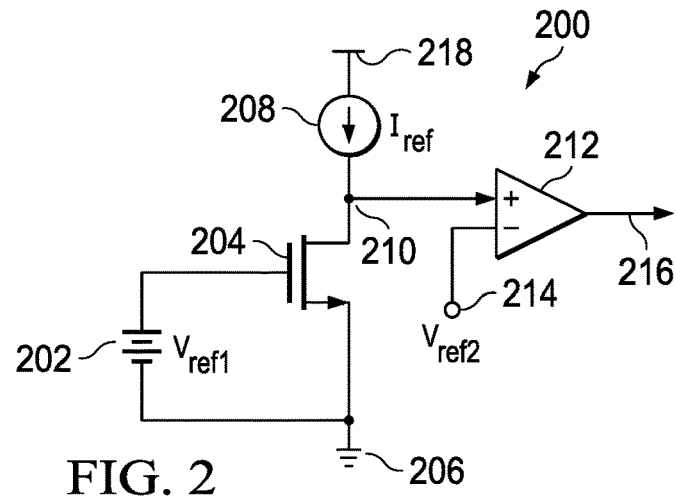
FIG. 2 is a schematic diagram of an example system in accordance with various examples.

FIG. 2 is a block diagram of an example system 200. System 200 operates similarly to system 100, except system 200 includes a comparator to determine whether the process variations are above an acceptable threshold. As with system 100, system 200 is useful for a test engineer to detect process variations and take corrective actions, or it can be used with additional adjustment circuitry to take corrective actions during operation of a device. In some examples, the system 200 is an electronic device that includes a voltage source $V_{ref1}$ 202, a FET 204 to be tested for process variations, and a current source $I_{ref}$ 208. FET 204 is an NFET in this example. $V_{ref1}$ 202 (e.g., a voltage source terminal) is coupled to ground 206 and the gate terminal of FET 204 to provide a voltage between the gate terminal of FET 204 and the source terminal of FET 204, which is further coupled to ground 206. $I_{ref}$ 208 is coupled to voltage source terminal 218 and coupled to the drain terminal of FET 204 and provides a reference current to the drain terminal of FET 204. In an example, $V_{ref1}$ is approximately 1 Volt, and $I_{ref}$ is approximately 10 µA. Comparator 212 comprises a first input terminal coupled to node 210 at the drain terminal of FET 204, and comprises a second input terminal coupled to reference voltage source $V_{ref2}$ 214. Comparator 212 further comprises an output terminal 216.

In an example operation, if FET 204 is stronger than normal due to process variations, then FET 204 will be strong enough to conduct most or all current from $I_{ref}$ 208. Node 210 (coupled to the drain terminal of FET 204) will therefore be pulled to a low voltage. For example, if $I_{ref}$ 208 is provided from a supply of 5 Volts, then the potential swing of node 210 is between 0 and 5 Volts. A low voltage on node 210 therefore is a voltage in the lower range of 0 to 5 Volts (such as between 0 and 2.5 Volts). Conversely, if the FET 204 has a normal or low strength, then FET 204 will conduct less current from $I_{ref}$ 208, and node 210 will be pulled to a high voltage within the voltage range, such as between 2.5 and 5 Volts. Comparator 212 compares the voltage at node 210 to the reference voltage $V_{ref2}$. For example, if $V_{ref2}$ is 2.5 Volts, then voltage values at node 210 above 2.5 Volts will result in a high output at output terminal 216, thereby indicating that FET 204 has a normal strength. Alternatively, if the voltage value at node 210 is below 2.5 Volts, then comparator 212 outputs a low value at output terminal 216, indicating that FET 204 has strength above a threshold due to process variations. In that case, corrective action can be taken to counter the strength of FET 204. In some examples, $V_{ref2}$ can be set to a value other than 2.5 Volts, such as 2.0 Volts or 3.0 Volts, in order to provide more or less sensitivity in detecting process variations. Another example includes multiple comparators and multiple thresholds to provide even finer detection of process variations. With multiple thresholds, one or more different corrective actions may be taken for each threshold that is reached.

FIG. 2 provides another solution for testing any individual FET for certain types of process variations. In some examples, instead of reading an analog voltage at node 110 as shown in FIG. 1, the binary output from comparator 212 in FIG. 2 may be more useful to take a corrective action. In either case, the output signal at node 110 or at output terminal 216 can be received by additional circuitry that takes a corrective action.

The examples of FIG. 1 and FIG. 2 have a FET operating in the saturation region. In some examples, the saturation region is more indicative of the operating region of drivers, which are a widespread application for FETs. Therefore, those examples test the FET with the FET operating in the saturation region. If the device under test operates in the linear region, then it may be advantageous to instead test the device while it operates in the linear region. In that case, appropriate voltage reference values and current references values are used, so the device operates in the linear region. Also, the example systems described above detect process variations in NFETs, but process variations can also be detected in PFETs in other examples.

Figure 3:
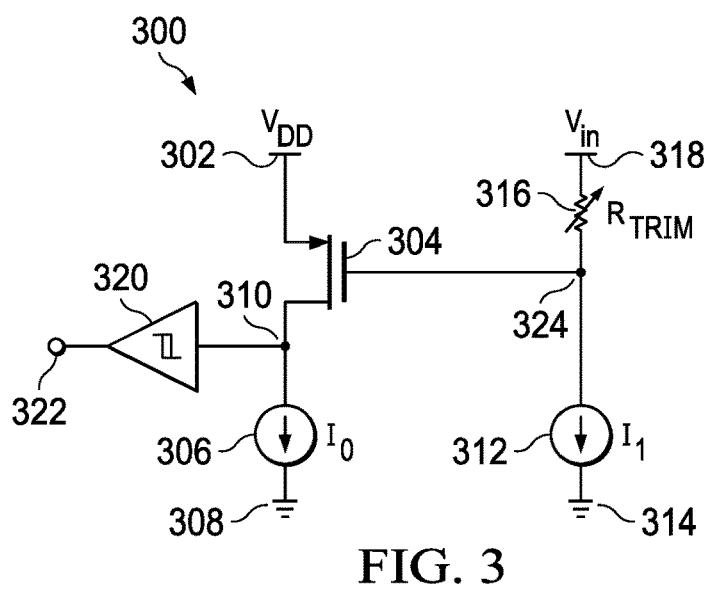
FIG. 3 is a schematic diagram of an example system in accordance with various examples.

FIG. 3 is a block diagram of an example system 300. As described above with respect to systems 100 and 200, system 300 is useful for a test engineer to detect process variations and take corrective actions, or it can be used with additional adjustment circuitry to take corrective actions during operation of a device. System 300 is an example implementation of a system utilized to detect whether a PFET device is stronger than a threshold due to process variations. System 300 comprises a voltage source $V_{dd}$ 302 coupled to a source terminal of a FET 304 (in this example, a PFET). FET 304 comprises a drain terminal coupled to a node 310 and further comprises a gate terminal coupled to a node 324. A current source $I_0$ 306 is coupled to node 310 and ground 308. A current source $I_1$ 312 is coupled to ground 314 and node 324, while a resistor $R_{TRIM}$ 316 is coupled to node 324 and voltage source $V_1$ 318. Also, a comparator 320 (such as a Schmitt trigger in this example) is coupled to node 310 and outputs a logical high or low at output terminal 322.

In operation, FET 304 has a source to gate voltage on its gate terminal provided by $I_1$ 312 and resistor $R_{TRIM}$ 316. Thus, the resistor $R_{TRIM}$ 316 and the current source $I_1$ 312 together form a voltage source. The gate voltage is independent of process variations. Current from $I_0$ 306 flows through FET 304, in a manner similar to the current flowing through FETs 104 and 204 in FIG. 1 and FIG. 2 respectively. If FET 304 is a strong device due to process variations, then the current through FET 304 will be at a relatively high level. In that example, node 310 will exhibit a high voltage, and the output terminal 322 of comparator 320 will also be high. A high output at output terminal 322 indicates that FET 304 is a strong device, and corrective action can be taken. If FET 304 operates in a normal range despite any process variations, then the current through FET 304 will be at a relatively low level, and node 310 will exhibit a low voltage.

The output terminal 322 of comparator will also be low. A low output at output terminal 322 indicates a device that is operating within an acceptable range, and therefore no corrective action is taken.

A variety of corrective actions may be taken in various examples. In an example, if a device is discovered to be too strong during testing, then test engineers can appropriately trim the device to reduce the physical size of the device, which in turn reduces the strength of the device. In other examples, additional adjustment circuitry can receive an input signal (such as a signal from node 110, output terminal 216, or output terminal 322) that indicates whether a device is within an acceptable operating range or whether the device is too strong. Responsive to that input signal, the additional adjustment circuitry takes a corrective action. In an example of corrective action described below, one or more FETs can be turned off to reduce the driver strength. In another example of corrective action described below, resistance can be added to a circuit to reduce driver strength.

Figure 4:
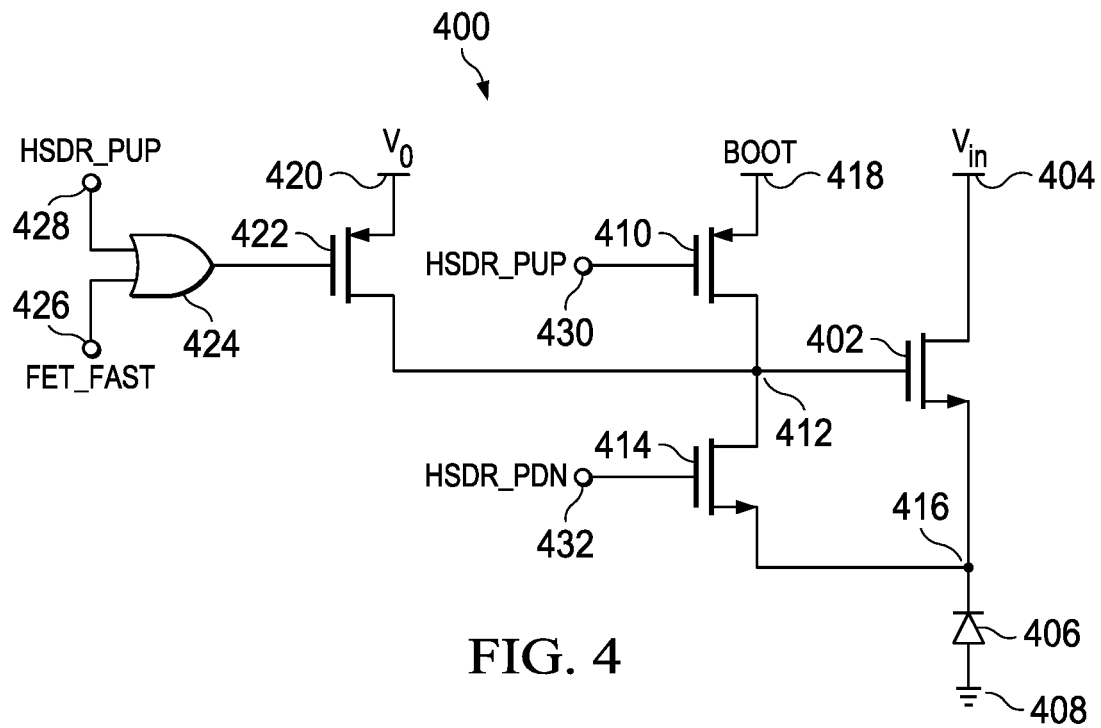
FIG. 4 is a schematic diagram of an example system in accordance with various examples.

FIG. 4 is a block diagram of an example system 400. System 400 shows an example in which the strength of a high-side (HS) FET driver is adjusted as described above based on whether a tested representative PFET device in the driver is determined to be strong. In other examples, the tested representative device could be an NFET device. In other examples, the strength of a low-side (LS) FET driver (not expressly depicted in the drawings) may be adjusted. In other examples, both high-side and low-side FET drivers may be similarly adjusted. The strength of the FET driver is adjusted by turning off one or more FETs within the driver, if process variations have rendered some or all FETs stronger than an acceptable strength. This corrective action results in fewer FETs driving the output of the driver. If process variations have rendered some or all FETs too strong, then turning off one or more FETs in the driver will reduce the speed and strength of the power FET that drives the output of the driver in an attempt to prevent damaging effects, such as ringing. The systems of FIG. 1, 2 or 3 are useful to determine whether a representative FET is a strong device due to process variations. If the FET is strong, then other FETs on the device may also be assumed to be strong. System 400 includes examples of these other FETs on the device, so one of the systems in FIG. 1, 2 or 3 could be co-located on a common device or system with one of the systems of FIG. 4 or 5. The determination that the representative FET in FIG. 1, 2 or 3 is strong is then provided to system 400, and a corrective action is taken to counter the excess strength of the FETs in system 400 due to the process variations.

In system 400, HS FET 402 (e.g., a power NFET of a switching power converter, such as a buck converter) comprises a drain terminal coupled to a voltage source $V_1$ 404. The source terminal of HS FET 402 is coupled to node 416. Diode 406 (the freewheeling diode of a buck converter that conducts output current when the HS FET is off) is coupled to node 416 and to ground 408. In an example, system 400 can comprise a buck converter, and may include an inductor and a capacitor in a buck converter configuration (not shown in FIG. 4). FET 410 is a PFET with a source terminal coupled to BOOT voltage source 418, a drain terminal coupled to node 412, and a gate terminal coupled to terminal 430 that receives a high-side drive signal HSDR_PUP to control FET 410. HSDR_PUP has a logic signal that commands HS FET 402 to turn on and pull up node 416. FET 414 is an NFET with a drain terminal coupled to node 412, a source terminal coupled to node 416, and a gate terminal coupled to terminal 432 that receives a high-side drive signal HSDR_PDN to control FET 414. HSDR_PDN is a logic signal that commands HS FET 402 to turn off. When HS FET 402 is off, output current from node 416 flows through diode 406 instead of HS FET 402. FET 422 is a PFET with a source terminal coupled to voltage source $V_O$ 420 and a drain terminal coupled to node 412. The gate terminal of FET 422 is coupled to an output of an OR gate 424. OR gate 424 receives as inputs the HSDR_PUP signal on a first terminal 428 and a FET_FAST signal on a second terminal 426. Terminals 428 and 430 are connected together in some examples, and are configured to receive the same signal in this example. Boot voltage source 418 and voltage source $V_O$ 420 are at the same voltage in some examples, and may be connected together in some examples. $V_{in}$ 404 may be the same voltage as boot voltage source 418 or voltage source $V_O$ 420 in some examples. Some examples may use PFETs instead of NFETs, and/or NFETs instead of PFETs.

In operation, FET 410, FET 414 and FET 422 drive HS FET 402 and thus form the driver for HS FET 402. However, if the drive strength of a representative FET (such as a FET in FIG. 3) is determined to be above an acceptable threshold, then the drive strengths of the FETs 422 and 410 are also likely to be above the threshold, so FET 422 can be turned off, and only FET 410 will drive the HS FET 402 on. Driving the HS FET 402 with only FET 410 will weaken the driver that was otherwise too strong. More specifically, appropriate voltage values at terminal 430 and terminal 432 turn on FETS 410 and 414, respectively. Also, responsive to the output of OR gate 424 being low, FET 422 is turned on, and therefore both FET 410 and FET 422 work together to drive HS FET 402 on. However, if process variations are detected in a representative FET that indicate drive strength in the FETs 422 and 410 is too high, then a detector circuit as described above (in FIG. 1, 2 or 3) asserts a FET_FAST signal to a logical "high." For example, signals at node 110 in FIG. 1, output terminal 216 in FIG. 2, or output terminal 322 in FIG. 3 indicate whether a FET has a drive strength above an acceptable threshold. Those signals are useful, either directly or with other appropriate adjustment circuitry, to assert a FET_FAST signal to a logical high value.

Referring again to FIG. 4, responsive to FET_FAST (which is provided to the second terminal 426 of OR gate 424) being high, the OR gate 424 outputs a high voltage to the gate terminal of FET 422. Responsive to the voltage at the gate terminal of FET 422 being high, FET 422 turns off, and only FET 410 remains active to drive HS FET 402. Therefore, a high signal asserted on FET_FAST results in weakening the driver that drives HS FET 402, so HS FET 402 is no longer driven too strongly due to the process variations. Detecting the process variations in a representative FET therefore allows one or more driver FETs to be turned on or off, in order to control the output strength of the driver. The FET_FAST signal is useful to switch multiple FETs on or off to control driver strength in some examples. For example, the FET_FAST signal is useful to adjust driver strength across a number of drivers on a chip. The FET_FAST signal is also useful to take corrective action in other components on the chip besides drivers. Any appropriate action can be taken to adjust for process variations based on a signal (such as the FET_FAST signal) that indicates whether process variations have passed an acceptable threshold. Although not shown in FIG. 4, corrective actions may be taken with respect to FET 414 if a representative NMOS (N-type metal oxide semiconductor) device is tested and determined to have process variations above an acceptable threshold.

Figure 5:
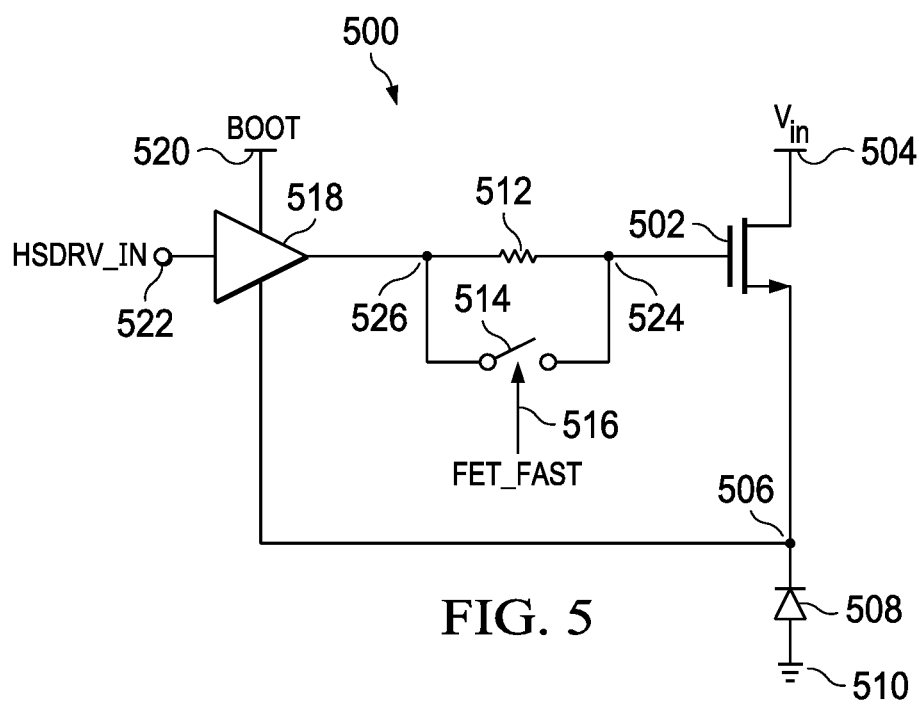
FIG. 5 is a schematic diagram of an example system in accordance with various examples.

FIG. 5 is a block diagram of an example system 500. System 500 shows an example in which the output strength of a high-side (HS) FET driver is adjusted based on whether a tested representative FET is determined to be strong. The tested representative device could be an NFET device or a PFET device. In system 500, the strength is adjusted by adding or removing a resistor via a switch controlled by a FET_FAST signal. If one or more FETs are determined to be too strong due to process variations (e.g., by testing a representative FET), then a resistor can be added in series by operating the switch to weaken the signal that drives the HS FET. The systems of FIG. 1, 2 or 3 are useful to determine whether a representative FET on a chip is a strong device due to process variations. If the FET is strong, then other FETs on the device may also be assumed to be strong. Examples of these other FETs on the device that can be assumed to be strong are shown in system 500. The determination that the representative FET in FIG. 1, 2 or 3 is strong is then provided to system 500, and a corrective action is taken to counter the excess strength of the FETs in system 500 due to the process variations.

HS FET 502 (e.g., a power FET of a switching power converter) is an NFET and comprises a drain terminal coupled to a voltage source $V_{in}$ 504, a source terminal coupled to a node 506, and a gate terminal coupled to a node 524. Although HS FET 502 is depicted as being an NFET, it may also be a PFET. A diode 508 (the freewheeling diode of a buck converter that conducts output current when the HS FET 502 is off) is coupled to node 506 and ground 510. Driver 518 drives HS FET in system 500. Driver 518 is coupled to BOOT voltage source 520 and node 506. Driver 518 comprises an input terminal 522 that receives a signal HSDRV_IN. The output terminal of driver 518 is coupled to node 526. In an example, driver 518 is a push-pull driver that turns HS FET 502 on and off responsive to the HSDRV_IN signal. In a switching converter, the HSDRV_IN signal is a pulse-width modulator output, which is a pulse with a controlled width that represents the programmed HS FET on time.

System 500 further comprises a resistor 512, which is coupled between nodes 524 and 526. Switch 514 (e.g., a transistor) is also coupled between nodes 524 and 526. Switch 514 is controlled by a FET_FAST signal 516 and, in this example, switch 514 is coupled in parallel to resistor 512.

In an example operation, the FET_FAST signal 516 is asserted responsive to a detector (such as the systems of FIG. 1, 2 or 3) determining that process variations have produced one or more FETs that have strength above an acceptable threshold (such as described above). These FETs can cause a circuit component (such as driver 518) to be too strong at its output. Therefore, if driver 518 is too strong, then FET_FAST signal 516 is asserted, and the signal opens switch 514. With switch 514 open, a drive signal from driver 518 travels through resistor 512 to reach the gate terminal of HS FET 502. Resistor 512 reduces the strength of the signal, and therefore HS FET 502 will no longer be driven too strongly. Alternatively, if the FET_FAST signal 516 is not asserted, then switch 514 is closed, so the signal from driver 518 bypasses resistor 512 and drives HS FET 502 at full strength. Also, if process variations have rendered driver 518 too strong, then HS FET 502 is likely too strong as well. Adding resistor 512 by opening switch 514 also compensates for HS FET 502 being too strong.

FIG. 5 illustrates an example system for taking a corrective action if process variations have rendered one or more FETs too strong for proper operation of a driver. These corrective actions can also be performed for other components besides drivers. In other examples, multiple switches and/or multiple resistors counter the effects of process variations that exceed an acceptable threshold. In other examples, the corrective actions shown in FIG. 4 and FIG. 5 can be combined to correct process variations that exceed an acceptable threshold.

Figure 6:
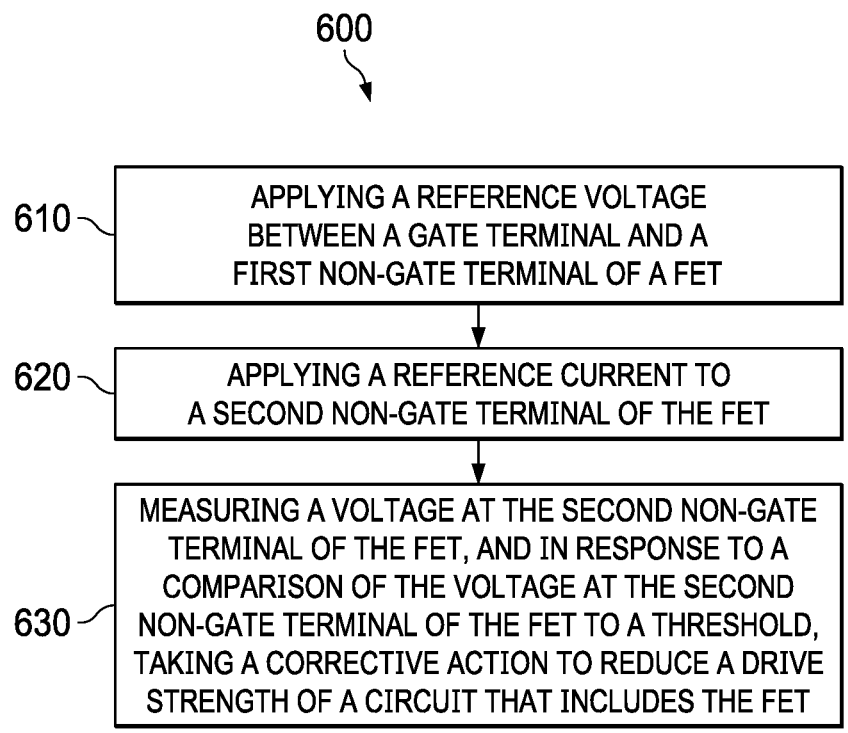
FIG. 6 is a flowchart of an example method for detecting process variations in a semiconductor.

FIG. 6 is a flowchart of an example method 600 for detecting process variations in a semiconductor. Although the method steps are described in conjunction with FIGS. 1-5, any system configured to perform the method steps, in any suitable order, is within the scope of this description.

Method 600 begins at step 610, where a voltage source applies a reference voltage between a gate terminal and a first non-gate terminal of a FET. For example, $V_{ref}$ 102 in FIG. 1 or $V_{ref1}$ 202 in FIG. 2 applies the reference voltage. The reference voltage can cause the transistor to operate in either the linear region or the saturation region, depending on which is suitable for the particular application.

Method 600 continues at step 620, where a current source applies a reference current to a second non-gate terminal of the FET. Any type of current source may be used. The value of the current source can be selected, so the FET operates in the appropriate region for the particular application. The value of the current source can also be selected, so the voltage at the second non-gate terminal is a value that accurately reflects the process variation in the FET.

Method 600 continues at step 630, where a controller measures a voltage at the second non-gate terminal of the FET. Responsive to a comparison of the voltage at the second non-gate terminal of the FET to a threshold, additional adjustment circuitry can take a corrective action to reduce a drive strength of a circuit that includes the FET. For example, the additional adjustment circuitry can output a signal to turn on or off one or more other transistors in the circuit and thereby counter the effect of process variations. As another example, the additional adjustment circuitry can switch a resistance in or out of a circuit to counter the effect of process variations. The additional adjustment circuitry can take any of the corrective actions described herein, or any other suitable actions that operate to counter the effect of process variations within one or more components in the circuit.

Figure 7:
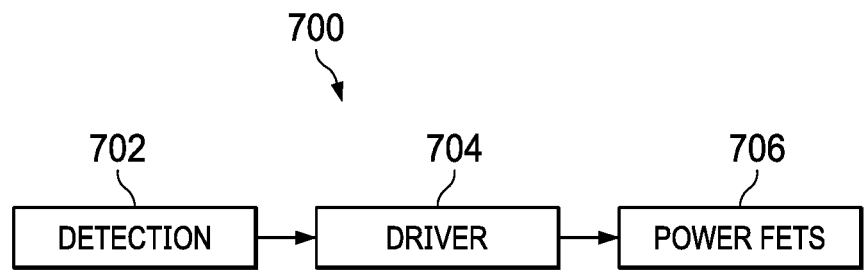
FIG. 7 is a schematic diagram of an example system in accordance with various examples.

FIG. 7 is a block diagram of an example power converter system 700. In some examples, system 700 is a buck power converter. System 700 comprises a detection system shown as detector 702, which comprises circuitry that detects a process variation of a representative transistor and produces an output that indicates whether process variations exceed a particular threshold. Detector 702 may include any suitable circuitry. For example, detector 702 may comprise systems 100, 200 or 300. As described above, systems 100, 200 and 300 are configured to detect a process variation of a representative transistor.

System 700 further comprises a driver system shown as driver 704, which comprises a driver circuit or circuitry that drives another component of system 700. For example, driver 704 may comprise systems 400 or 500 described above. Driver 704 may comprise any suitable circuitry configured to drive another component. Also, driver 704 is configured to receive, at a driver circuit input, an output from detector 702 that indicates whether process variations exceed a particular threshold. Driver 704 then takes one or more corrective actions if the one or more process variations exceed the threshold, as described above with respect to FIGS. 4 and 5. For example, driver 704 can adjust a signal at a driver circuit output responsive to the driver circuit input.

System 700 further comprises power FETs 706, which may comprise high side and low side power FETs in this example. Power FETs 706 are driven by driver 704. Driver 704 drives power FETs 706 based on the level of process variations detected by detector 702. If detector 702 determines that process variations are above a particular threshold, then driver 704 may take one or more corrective actions to prevent power FETs 706 from being driven too strongly, which could otherwise cause unwanted effects or damage to the system 700.

In this description, the term "couple" may cover connections, communications, or signal paths that enable a functional relationship consistent with this description. For example, if device A generates a signal to control device B to perform an action, then: (a) in a first example, device A is coupled to device B; or (b) in a second example, device A is coupled to device B through intervening component C if intervening component C does not substantially alter the functional relationship between device A and device B, such that device B is controlled by device A via the control signal generated by device A. Also, in this description, a device that is "configured to" perform a task or function may be configured (e.g., programmed and/or hardwired) at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device, or a combination thereof. Furthermore, in this description, a circuit or device that includes certain components may instead be adapted to be coupled to those components to form the described circuitry or device. For example, a structure described as including one or more semiconductor elements (such as transistors), one or more passive elements (such as resistors, capacitors and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, such as by an end-user and/or a third party.

While certain components may be described herein as being of a particular process technology, these components may be exchanged for components of other process technologies. Circuits described herein are reconfigurable to include the replaced components to provide functionality at least partially similar to functionality available before the component replacement. Components illustrated as resistors, unless otherwise stated, are generally representative of any one or more elements coupled in series and/or parallel to provide an amount of impedance represented by the illustrated resistor. For example, a resistor or capacitor illustrated and described herein as a single component may instead be multiple resistors or capacitors, respectively, coupled in series or in parallel between the same two nodes as the single resistor or capacitor. Also, uses of the phrase "ground voltage potential" in this description include a chassis ground, an Earth ground, a floating ground, a virtual ground, a digital ground, a common ground, and/or any other form of ground connection applicable to, or suitable for, the teachings of this description. Unless otherwise stated, "about", "approximately", or "substantially" preceding a value means+/−10 percent of the stated value.

Modifications are possible in the described examples, and other examples are possible, within the scope of the claims.

What is claimed is:

1. A circuit, comprising:
   a voltage source terminal;
   a voltage reference terminal;
   a field effect transistor (FET) having a gate terminal and a non-gate terminal, the gate terminal coupled to the voltage source terminal;
   a current source coupled to the non-gate terminal;
   a comparator having a comparator output and first and second comparator inputs, the first comparator input coupled to the non-gate terminal, and the second comparator input coupled to the voltage reference terminal; and
   adjustment circuitry having a circuitry input and a circuitry output, the circuitry input coupled to the comparator output, and the adjustment circuitry configured to adjust the circuitry output responsive to the circuitry input, in which the adjustment reduces a drive strength of the circuit.

2. The circuit of claim 1, wherein the adjustment circuitry comprises an OR gate having an input coupled to the circuitry input.

3. The circuit of claim 2, wherein the OR gate has an output, the FET is a first FET, the gate terminal is a first gate terminal, the circuit further comprises a second FET having a second gate terminal, and the output of the OR gate is coupled to the second gate terminal.

4. The circuit of claim 3, wherein the non-gate terminal is a first non-gate terminal, the second FET comprises a second non-gate terminal, the circuit further comprises a third FET having a third non-gate terminal, and the second non-gate terminal is coupled to the third non-gate terminal.

5. The circuit of claim 4, further comprising a power FET coupled to the third non-gate terminal, wherein the second FET and the third FET are configured to drive the power FET.

6. The circuit of claim 1, wherein the adjustment circuitry comprises a switch and a resistor, and the switch is coupled in parallel to the resistor.

7. The circuit of claim 6, wherein the FET is a first FET, the gate terminal is a first gate terminal, the circuit further comprises a second FET having a second gate terminal, and the resistor is coupled to the second gate terminal.

8. The circuit of claim 1, wherein the current source is a first current source, the circuit further comprises a second current source, and the voltage source terminal is coupled to a voltage source comprising a resistor coupled to the second current source.

9. A device, comprising:
   a voltage source terminal;
   a current source;
   a field effect transistor (FET) having a gate terminal and a non-gate terminal, the gate terminal coupled to the voltage source terminal, and the non-gate terminal coupled to the current source;
   a comparator having a comparator input and a comparator output, the comparator input coupled to the non-gate terminal, and the comparator output configured to indicate a drive strength of the FET; and
   a circuit having a circuit input and a circuit output, the circuit input coupled to the comparator output, the circuit output adapted to be coupled to a power FET, and the circuit configured to reduce a drive strength of the circuit output responsive to the circuit input.

10. The device of claim 9, wherein the current source is a first current source, the device further comprises a second current source, and the voltage source terminal is coupled to a voltage source comprising a resistor coupled to the second current source.

11. The device of claim 9, wherein the FET is a first FET, and the device further comprises:
a second FET adapted to be coupled to the power FET; and
an OR gate having an input terminal and an output terminal, the input terminal of the OR gate coupled to the comparator output, the output terminal of the OR gate coupled to the second FET, and the OR gate configured to turn off the second FET responsive to the comparator output.

12. The device of claim 9, further comprising:
a resistor coupled to the circuit and adapted to be coupled to the power FET; and
a switch coupled in parallel to the resistor, the switch configured to bypass the resistor responsive to the comparator output.

13. The device of claim 9, wherein the device comprises a buck power converter.

14. A power converter system, comprising:
a voltage source terminal;
a current source;
a first field effect transistor (FET), in which the first FET is a power FET;
a driver circuit having a driver circuit input and a driver circuit output, the driver circuit output coupled to the first FET, and the driver circuit configured to adjust a signal at the driver circuit output responsive to the driver circuit input;
a second FET having a gate terminal and a non-gate terminal, the gate terminal coupled to the voltage source terminal, and the non-gate terminal coupled to the current source; and
a comparator having a comparator input and a comparator output, the comparator input coupled to the non-gate terminal, and the comparator output coupled to the driver circuit input and configured to indicate a drive strength of the second FET.

15. The power converter system of claim 14, wherein the current source is a first current source, the power converter system further comprises a second current source, and the voltage source terminal is coupled to a voltage source comprising a resistor coupled to the second current source.

16. The power converter system of claim 14, wherein the power converter system comprises a buck converter.

17. The power converter system of claim 14, wherein the driver circuit comprises a third FET and a logic gate, the third FET is coupled to the logic gate, and the logic gate is configured to control the third FET responsive to the comparator output.

18. The power converter system of claim 14, further comprising:
a resistor coupled to the driver circuit and to the first FET; and
a switch coupled in parallel with the resistor, the switch configured to be controlled responsive to the comparator output.

19. A method, comprising:
applying a reference voltage between a gate terminal and a first non-gate terminal of a field effect transistor (FET);
applying a reference current to a second non-gate terminal of the FET;
measuring a voltage at the second non-gate terminal; and
responsive to a comparison of the voltage at the second non-gate terminal to a threshold, taking a corrective action to reduce a drive strength of a circuit that includes the FET.

20. The method of claim 19, wherein taking the corrective action comprises adding a resistance to the circuit that includes the FET.

21. The method of claim 19, wherein the FET is a first FET, and taking the corrective action comprises turning off a second FET in the circuit that includes the first FET.

22. The method of claim 19, wherein taking the corrective action comprises altering a physical parameter of the FET.

23. The method of claim 19, wherein the reference voltage is a first reference voltage, and the method further comprises comparing the voltage at the second non-gate terminal to a second reference voltage to determine a drive strength of the FET.

24. The method of claim 19, wherein the reference voltage and the reference current cause the FET to operate in a saturation region.

* * * * *